United States Patent
Lee et al.

(10) Patent No.: US 11,114,654 B2
(45) Date of Patent: Sep. 7, 2021

(54) NEGATIVE ELECTRODE ACTIVE MATERIAL HAVING HIGH OUTPUT CHARACTERISTICS AND LITHIUM SECONDARY BATTERY INCLUDING THE SAME

(71) Applicant: LG CHEM, LTD., Seoul (KR)

(72) Inventors: Bo-Ram Lee, Daejeon (KR); Sung-Bin Park, Daejeon (KR); Ji-Young Park, Daejeon (KR); Chi-Ho Jo, Daejeon (KR); Jung-Min Han, Daejeon (KR); Hyuck Hur, Daejeon (KR); Wang-Mo Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 345 days.

(21) Appl. No.: 16/311,110

(22) PCT Filed: Mar. 21, 2018

(86) PCT No.: PCT/KR2018/003316
§ 371 (c)(1),
(2) Date: Dec. 18, 2018

(87) PCT Pub. No.: WO2018/174573
PCT Pub. Date: Sep. 27, 2018

(65) Prior Publication Data
US 2020/0313158 A1    Oct. 1, 2020

(30) Foreign Application Priority Data

Mar. 21, 2017 (KR) .......................... 10-2017-0035600

(51) Int. Cl.
*H01M 4/131* (2010.01)
*H01M 4/133* (2010.01)
*H01M 4/134* (2010.01)
*H01M 2/16* (2006.01)
*H01M 10/0525* (2010.01)
*H01M 50/46* (2021.01)
*H01M 4/02* (2006.01)

(52) U.S. Cl.
CPC ............ *H01M 4/131* (2013.01); *H01M 4/133* (2013.01); *H01M 4/134* (2013.01); *H01M 10/0525* (2013.01); *H01M 50/46* (2021.01); *H01M 2004/021* (2013.01); *H01M 2004/027* (2013.01); *H01M 2004/028* (2013.01)

(58) Field of Classification Search
CPC ...... H01M 4/131; H01M 4/133; H01M 4/134; H01M 50/46; H01M 10/0525
See application file for complete search history.

(56) References Cited

U.S. PATENT DOCUMENTS

| | | | |
|---|---|---|---|
| 2005/0221188 A1 | 10/2005 | Takami et al. | |
| 2008/0031798 A1* | 2/2008 | Bourbon | C01G 23/003 423/331 |
| 2011/0086248 A1 | 4/2011 | Nakura | |
| 2011/0086275 A1 | 4/2011 | Lee et al. | |
| 2012/0045693 A1 | 2/2012 | Eom | |
| 2014/0017567 A1 | 1/2014 | Oh et al. | |
| 2014/0027679 A1* | 1/2014 | Kim | H01M 4/364 252/507 |
| 2014/0322609 A1 | 10/2014 | Choi et al. | |

FOREIGN PATENT DOCUMENTS

| | | |
|---|---|---|
| CN | 102376945 A | 3/2012 |
| EP | 3567662 A2 | 11/2019 |
| JP | 2014-086164 A | 5/2014 |
| JP | 2016-000681 A | 1/2016 |
| JP | 2016-103324 A | 6/2016 |
| JP | 2016-103326 A | 6/2016 |
| KR | 10-2007-0047810 A | 5/2007 |
| KR | 10-2009-0045187 A | 5/2009 |
| KR | 10-2011-0008338 A | 1/2011 |
| KR | 10-2013-0117716 A | 10/2013 |
| KR | 10-2014-0008954 A | 1/2014 |
| KR | 10-2014-0009921 A | 1/2014 |
| KR | 10-2016-0059361 A | 5/2016 |
| WO | WO 2014/010973 A1 | 1/2014 |
| WO | WO 2018/169290 A2 | 9/2018 |

OTHER PUBLICATIONS

Gao et al., "High-density spherical $Li_4Ti_5O_{12}$/C anode material with good rate capability for lithium ion batteries", Journal of Power Sources, Elsevier SA, CH, vol. 166, No. 1, Mar. 8, 2007, pp. 255-259, XP005933161, ISSN: 0378-7753, DOI: 10.1016/J.JPOWSOUR.2007.01.014.
International Search Report for PCT/KR2018/003316 (PCT/ISA/210) dated Jun. 28, 2018.
Indian Office Action for corresponding Indian Patent Application No. 201917013118 dated Feb. 2, 2021 with translation.

* cited by examiner

*Primary Examiner* — Jayne L Mershon
(74) *Attorney, Agent, or Firm* — Birch, Stewart, Kolasch & Birch, LLP

(57) ABSTRACT

Disclosed are a negative electrode active material including lithium titanium oxide particles, wherein the lithium titanium oxide particles have an average particle diameter ($D_{50}$) of 0.5-9 μm, a specific surface area of 3-7 m$^2$/g, and a pellet density of 1.7 g/cc or more under a pressure of 64 MPa, and a lithium secondary battery including the same.

10 Claims, No Drawings

NEGATIVE ELECTRODE ACTIVE MATERIAL HAVING HIGH OUTPUT CHARACTERISTICS AND LITHIUM SECONDARY BATTERY INCLUDING THE SAME

TECHNICAL FIELD

The present disclosure relates to a negative electrode active material having high output characteristics and a lithium secondary battery including the same.

The present application claims priority to Korean Patent Application No. 10-2017-0035600 filed on Mar. 21, 2017 in the Republic of Korea, the disclosures of which are incorporated herein by reference.

BACKGROUND ART

A need for an eco-friendly substitute energy source has become an essential factor for the future life, as the cost of energy sources has been increased due to the depletion of fossil fuel and the interest about environmental pollution has been increased.

Efforts into research and development of electrochemical devices have been activated gradually, as the application spectrum of electrochemical devices have been extended to cellular phones, camcorders and notebook computers, and to energy sources for electric vehicles.

In this context, electrochemical devices have been most spotlighted. Particularly, development of rechargeable secondary batteries has been focused. Recently, many studies have been conducted about designing a novel electrode and battery in order to improve the capacity density and specific energy in developing such batteries.

Particularly, in the case of a lithium secondary battery, its application is realized as a power source for electric vehicles (EV), hybrid electric vehicles (HEV), micro-hybrid electric vehicles (u-HEV), or the like. In addition, application of a lithium secondary battery has been extended to a supplementary electric power source through gridation.

A micro-hybrid vehicle partially uses a secondary battery and development of a 12V dual or 48V secondary battery used therefor has been carried out with a view to higher output performance.

Meanwhile, lithium titanium oxide shows an initial charge/discharge cycle efficiency of approximately 100% and has a high operating voltage so that no surface film is formed on a negative electrode due to the decomposition of an electrolyte. Thus, application of lithium titanium oxide to a negative electrode material for providing high output is expected.

Thus, use of lithium titanium oxide is essential in order to realize high rate charge/discharge characteristics of 20 C or more. However, there is a problem in that currently used lithium titanium oxide cannot satisfy the corresponding output.

Therefore, there is still a need for a lithium titanium oxide negative electrode material which can be applied to the field of hybrid vehicles requiring high output characteristics.

DISCLOSURE

Technical Problem

The present disclosure is designed to solve the problems of the related art, and therefore the present disclosure is directed to providing a negative electrode active material which can be used for a battery having high output characteristics and is obtained through a simple manufacturing process.

The present disclosure is also directed to providing a lithium secondary battery provided with the negative electrode active material.

Technical Solution

In one aspect of the present disclosure, there is provided a negative electrode active material in order to solve the above-mentioned technical problems.

According to a first embodiment of the present disclosure, there is provided a negative electrode active material including lithium titanium oxide particles, wherein the lithium titanium oxide particles have an average particle diameter ($D_{50}$) of 0.5-9 μm, a specific surface area of 3-7 m²/g, and a pellet density of 1.7 g/cc or more under a pressure of 64 MPa, and the lithium titanium oxide is represented by the following Chemical Formula 1:

$$Li_xTi_yO_zM_w \qquad \text{[Chemical Formula 1]}$$

Wherein M is any one selected from the group consisting of Zr, B, Sn, S, Be, Ge and Zn, or a combination of two or more of them, $0.5 \le x \le 5$, $1 \le y \le 5$, $2 \le z \le 12$, and $0 \le w < 0.1$.

According to a second embodiment, there is provided the negative electrode active material of the first embodiment, wherein the lithium titanium oxide particles are at least one selected from primary particles and secondary particles formed of the primary particles.

According to a third embodiment, there is provided the negative electrode active material of the second embodiment, wherein the primary particles have an average particle diameter ($D_{50}$) of 0.2-1.2 μm and a specific surface area of 5-7 m²/g.

According to a fourth embodiment, there is provided the negative electrode active material of the second or the third embodiment, wherein the primary particles have a pellet density of 1.7-1.82 g/cc under a pressure of 64 MPa.

According to a fifth embodiment, there is provided the negative electrode active material of the second embodiment, wherein the secondary particles have an average particle diameter ($D_{50}$) of 2-9 μm and a specific surface area of 3-4.9 m²/g.

According to a sixth embodiment, there is provided the negative electrode active material of the second or the fifth embodiment, wherein the secondary particles have a pellet density of 1.75-1.85 g/cc under a pressure of 64 MPa.

According to a seventh embodiment, there is provided the negative electrode active material of any one of the second to the sixth embodiments, wherein the lithium titanium oxide particles is a mixture of primary particles with secondary particles, and the weight ratio of the primary particles to the secondary particles is between 1:9 and 4:6.

According to an eighth embodiment, there is provided the negative electrode active material of any one of the first to the seventh embodiments, wherein the lithium titanium oxide is at least one selected from the group consisting of $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, $LiTi_2O_4$ and $Li_2TiO_3$.

According to a ninth embodiment, there is provided the negative electrode active material of any one of the first to the eighth embodiments, which further includes any one active material particles selected from the group consisting of: a carbonaceous material; metal (Me), such as Si, Sn, Li, Zn, Mg, Cd, Ce, Ni or Fe; alloy including the metal (Me);

oxide (MeOx) of the metal (Me); and a composite of the metal (Me) with carbon, or a combination of two or more of them.

In another aspect of the present disclosure, there is also provided a lithium secondary battery in order to solve the above-mentioned technical problems.

According to a tenth embodiment of the present disclosure, there is provided a lithium secondary battery including a positive electrode including a positive electrode active material, a negative electrode including a negative electrode active material, a separator interposed between the positive electrode and the negative electrode, and an electrolyte, wherein the negative electrode active material is the negative electrode active material as defined in any one of the first embodiment to the ninth embodiment.

Advantageous Effects

According to an embodiment of the present disclosure, it is possible to improve capacity maintenance at a high rate and to ensure initial capacity through the use of a negative electrode active material obtained by controlling the average particle diameter ($D_{50}$), specific surface area (BET) and pellet density of lithium titanium oxide particles. Thus, it is possible to apply the negative electrode active material to a battery, such as a micro-hybrid battery, for vehicles requiring high output.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a negative electrode active material including lithium titanium oxide particles, wherein the lithium titanium oxide particles have an average particle diameter ($D_{50}$) of 0.5-9 μm, a specific surface area of 3-7 m²/g, for instance, 4-7 m²/g, and a pellet density of 1.7 g/cc or more under a pressure of 64 MPa, and the lithium titanium oxide is represented by the following Chemical Formula 1:

$$Li_xTi_yO_zM_w$$ [Chemical Formula 1]

Wherein M is any one selected from the group consisting of Zr, B, Sn, S, Be, Ge and Zn, or a combination of two or more of them, 0.5≤x≤5, 1≤y≤5, 2≤z≤12, and 0≤w<0.1.

In addition, the lithium titanium oxide may have at least one crystal structure selected from spinel, perovskite and orthorhombic, but is not limited thereto.

For example, the lithium titanium oxide may be $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, $LiTi_2O_4$, $Li_2TiO_3$, or the like. More particularly, the lithium titanium oxide may be $Li_4Ti_5O_{12}$, $Li_{1.33}Ti_{1.67}O_4$ or $LiTi_2O_4$ which has an excellent spinel structure undergoing little change in crystal structure during charging/discharging, but is not limited thereto.

According to an embodiment of the present disclosure, the lithium titanium oxide (LTO) may be in the form of lithium titanium oxide primary particles, secondary particles formed by aggregation of a plurality of primary particles, or a mixture of such primary particles with secondary particles.

According to an embodiment of the present disclosure, the lithium titanium oxide may include a small amount of non-aggregated primary particles of free lithium titanium oxide, besides lithium titanium oxide secondary particles, but may substantially include secondary particles.

According to an embodiment of the present disclosure, lithium titanium oxide used as a negative electrode active material may preferably include the secondary particles of lithium titanium oxide in an amount of 60 wt % or more, 70 wt % or more, 80 wt % or more, 90 wt % or more, 95 wt % or more, or 99 wt % or more, based on 100 wt % of the total lithium titanium oxide contained in the negative electrode.

According to an embodiment of the present disclosure, when the lithium titanium oxide (LTO) is a mixture of lithium titanium oxide primary particles with secondary particles, the weight ratio of the primary particles to the secondary particles may be between 1:9 and 4:6, particularly between 1:9 and 3:7. When the weight ratio satisfies the above-defined range, it is possible for the lithium titanium oxide particles to have a desired pellet density, so that it may be applied to a high-output battery.

According to the present disclosure, lithium titanium oxide particles may have an average particle diameter (volume based average particle diameter, $D_{50}$) of 0.5-9 μm, particularly 2-8 μm, and more particularly 3.5-7.5 μm.

Particularly, when the lithium titanium oxide particles are primary particles, $D_{50}$ of the primary particles may be 0.2-1.2 μm, particularly 0.4-0.7 μm. In addition, when the lithium titanium oxide particles are secondary particles, $D_{50}$ of the secondary particles may be 2-9 μm, more particularly 3.5-8.2 μm. Herein, $D_{50}$, a volume based average particle diameter, is the diameter of particles corresponding to 50% of the total volume when accumulating volumes from smaller particles after measuring particle diameters by using a particle size analyzer.

Each of the primary particles and the secondary particles may independently have a spherical or pseudo-spherical shape. Herein, the term 'pseudo-spherical' refers to a three-dimensional volume including an elliptical shape and covers any shapes of particles, such as amorphous particles whose shape cannot be defined.

In addition, according to an embodiment of the present disclosure, the negative electrode active material layer has a porous structure including a plurality of pores, and such a porous structure may be derived from at least one of the characteristics of the shapes of lithium titanium oxide particles as described hereinafter.

The lithium titanium oxide secondary particles have a porous structure having a plurality of pores formed on the surface and in the body of the secondary particles due to a plurality of pores formed among the aggregated primary particles. In addition, the lithium titanium oxide primary particles may have a porous structure including a plurality of pores formed on the surface and in the body of the primary particles. The pores are interconnected with at least one of the other adjacent pores and thus can function as a channel of an electrolyte. Therefore, the pores formed in the particles and interconnected with each other have a function as a channel through which an electrolyte flows.

According to an embodiment of the present disclosure, the lithium titanium oxide particles may have a specific surface area of 3-7 $m^2/g$, particularly 3.5-6.5 $m^2/g$, and more particularly 4-6.3 $m^2/g$.

When the lithium titanium oxide particles have a specific surface area satisfying the above-defined range, it is possible to ensure high output with high rate characteristics.

Particularly, when the lithium titanium oxide particles are primary particles, the primary particles may have a specific surface area of 5-7 $m^2/g$, particularly 6-6.5 $m^2/g$. In addition, when the lithium titanium oxide particles are secondary particles, the secondary particles may have a specific surface area of 3-4.9 $m^2/g$, particularly 3.5-4.8 $m^2/g$. Herein, the specific surface area is determined by using Brunauer Emmett Teller (BET) surface area analyzer.

The pellet density (pressing density) relates to how much the negative electrode active material is pressed during the pressing thereof. Higher pressing density is advantageous in that it provides a cell with higher energy density. As pressing density is decreased, particle strength is increased and content of small particles (primary particles) is decreased.

For example, determination of the pressing density of the negative electrode active material may be carried out by using MCP-PD51, a powder resistance measuring system available from Mitsubishi Chemical. In the case of the powder resistance measuring system, a predetermined amount of negative electrode active material particles is introduced to a cylinder type load cell and force is applied thereto continuously. Then, the density measured while the particles are pushed is determined. When particle strength is increased, particles are less pushed under the same pressure and thus have lower pressing density. When an adequate amount of lithium titanium oxide particles having a small particle diameter is present, high pressing density may be provided.

According to the present disclosure, the lithium titanium oxide particles may have a pellet density of 1.7 g/cc or more, particularly, 1.7-1.85 g/cc, and more particularly 1.74-1.82 g/cc, under a pressure of 64 MPa.

Particularly, when the lithium titanium oxide particles are primary particles, the primary particles may have a pellet density of 1.7-1.82 g/cc, particularly 1.72-1.78 g/cc, under a pressure of 64 MPa. In addition, when the lithium titanium oxide particles are secondary particles, the secondary particles may have a pellet density of 1.75-1.85 g/cc, particularly 1.76-1.82 g/cc, under a pressure of 64 MPa.

When the lithium titanium oxide particles include primary particles alone, a pellet density of 1.7 g/cc or more prevents a current collector, such as Al foil, from being torn. However, when the lithium titanium oxide particles include secondary particles, it is possible to prevent tearing of a current collector only when the particles have a pellet density of 1.75 g/cc or more. When the lithium titanium oxide particles include primary particles alone, pressure cannot be transferred to a current collector even when a large extent of pressure is applied. On the contrary, when large particles (secondary particles) are present, the corresponding pressure can be transferred to the current collector.

Referring to the number of particles, when the lithium titanium oxide particles include primary particles alone, the number of primary particles is larger as compared to those particles including secondary particles. Thus, a relatively low pressure may be transferred to a current collector, such as Al foil. However, when the lithium titanium oxide particles include secondary particles, the number of particles is smaller as compared to those particles including primary particles alone. Thus, the pressure transferred to one particle is increased and the impact applied to the current collector is also increased. Therefore, when the lithium titanium oxide particles include secondary particles, it is required to carry out compression more thoroughly during the manufacture of an electrode. Herein, the expression 'carry out compression more thoroughly (or compress more highly)' means that the particles are subjected to lower force under the same pressure condition (i.e. the particles have a higher pellet density value).

The pores formed between the lithium titanium oxide secondary particles and the other secondary particles of primary particles contained in the other adjacent secondary particles when the two types of particles are in contact with each other may affect the porous characteristics of a negative electrode active material layer.

Lithium titanium oxide has a spinel structure and shows a three-dimensional Li diffusion path, which is favorable to realization of high-speed charging and high output characteristics. In addition, lithium titanium oxide retains its original crystal structure during charging/discharging to provide excellent structural stability.

In addition, the lithium titanium oxide may have a discharge capacity of 70-200 mAh/g, preferably 100-170 mAh/g, and more preferably 110-160 mAh/g.

According to an embodiment of the present disclosure, the lithium titanium oxide particles may have a crystallite size of 100-200 nm, particularly 110-180 nm, and more particularly 120-180 nm.

When the crystallite size is less than 100 nm, the number of grain boundaries is excessively large, thereby making it difficult to carry out lithium intercalation and causing degradation of charging characteristics. When the crystallite size is larger than 200 nm, lithium ion diffusion is difficult inside of the grains to increase resistance, resulting in degradation of output.

The crystallite size of lithium titanium oxide may be determined by using TOPAS, a program currently used for Rietveld refinement based on X-ray diffractometry. Determination of crystallite size using the TOPAS program may adopt any method used currently in the art.

In addition, the lithium titanium oxide may have a content of lithium carbonate, a byproduct of the manufacture thereof, of 2 wt % or less, 1 wt % or less, 0.5 wt % or less, 0.1 wt % or less, or 0.05 wt % or less, based on 100 wt % of lithium titanium oxide.

The lithium titanium oxide may be obtained by a liquid phase synthesis process, such as co-precipitation, sol-gel or hydrothermal process, but is not limited thereto. There is no particular limitation in the method for preparing lithium titanium oxide, as long as the lithium titanium oxide particles having the characteristics disclosed herein can be obtained.

An embodiment of the method for preparing the lithium titanium oxide (LTO) will be explained hereinafter.

First, a lithium-containing precursor (such as LiOH) and a titanium-containing precursor (such as $TiO_2$) are subjected to wet milling, mixed in a solid phase and agitated in water to obtain a slurry. Next, the slurry is spray dried at a predetermined hot air temperature, baked under oxygen or air atmosphere and then pulverized to obtain lithium titanium oxide powder.

Herein, when the lithium titanium oxide is formed into primary particles, it is prepared to have the smallest particle diameter by modifying the spray drying condition. In this case, it is possible to control the particle size during the pulverization after baking. When the lithium titanium oxide is formed into secondary particles, it is possible to accomplish a predetermined particle size by modifying the spray drying condition and to obtain secondary particles by carrying out disintegration after baking.

When the lithium-containing precursor and the titanium-containing precursor are subjected to wet milling, it is possible to control the particle size of $TiO_2$ by adjusting the milling time and rpm, and thus to modify the specific surface area (BET) of the lithium titanium oxide particles (powder). Particular examples of the method for increasing the specific surface (BET) of the lithium titanium oxide particles (powder) include modifying the milling conditions (increasing time, rpm, etc.), increasing pulverization strength, decreasing the baking temperature, or the like. Particular examples of the method for reducing the specific surface area include modifying the milling conditions (decreasing time, rpm, etc.), decreasing pulverization strength, increasing the baking temperature, or the like.

According to an embodiment of the present disclosure, the negative electrode active material may be loaded in an amount of 0.2-10 mAh/$cm^2$ in the negative electrode.

According to an embodiment of the present disclosure, the negative electrode active material layer may further include a binder resin and a conductive material. Herein, the negative electrode active material layer may include the negative electrode active material, conductive material and binder resin at a weight ratio of 80-95:3-13:2-9.

The negative electrode active material layer may further include any one active material particles selected from the group consisting of currently used negative electrode active materials, including a carbonaceous material such as natural graphite or artificial graphite; metal (Me), such as Si, Sn, Li, Zn, Mg, Cd, Ce, Ni or Fe; alloy of the metal (Me); oxide (MeOx) of the metal (Me); and a composite of the metal (Me) with carbon, or a combination of two or more of them.

Non-limiting examples of the binder resin include any one selected from: polyvinylidene fluoride-hexafluoropropylene, polytetrafluoroethylene (PTFE), polyvinylidene fluoride (PVDF), carboxymethyl cellulose (CMC), polyvinyl alcohol (PVA), polyvinyl butyral (PVB), poly-N-vinylpyrrolidone (PVP), styrene butadiene rubber (SBR), polyamide-imide, polyimide, or the like, or a combination of two or more of them.

The conductive material is not particularly limited, as long as it is an electron conductive material causing no chemical change. Particular examples of the conductive material may include natural graphite, artificial graphite, carbon black, acetylene black, ketjen black, Super-P black, carbon fibers, metal powder or metal fibers, such as copper, nickel, aluminum or silver, or the like.

According to an embodiment of the present disclosure, the negative electrode may be obtained by the method as described hereinafter.

First, a negative electrode active material, a binder resin and a conductive material are dispersed into an adequate solvent including an organic solvent, such as ethanol (EtOH), acetone, isopropyl alcohol, N-methylpyrrolidone (NMP) or propylene glycol (PG), or water to form a negative electrode slurry. Next, the negative electrode slurry is pressed to form a shape of electrode. Otherwise, the slurry is coated on metal foil to form a shape of electrode, or the composition for a negative electrode is rolled to form a sheet, which, in turn, is attached to metal foil to form a shape of electrode and the resultant electrode shape is dried at a temperature of 100-350° C. to obtain a negative electrode. More particularly, the negative slurry is pressed by using a roll press molding machine to form a negative electrode. The roll press molding machine is used to improve the electrode density and to control the electrode thickness through rolling, and includes a top roll, bottom roll, a controller capable of controlling the thickness of each roll and heating temperature, and an winding unit capable of winding and dewinding an electrode. When the roll-like electrode passes through the roll press, a pressing process is performed and the pressed electrode is wound again into a shape of roll to finish an electrode. Herein, the press has a pressing pressure of 5-20 ton/$cm^2$ and a roll temperature of 0-150° C. Then, the slurry subjected to the pressing process is subjected to a drying process. Herein, the drying process is carried out at a temperature of 100-350° C., preferably 150-300° C. When the drying temperature is lower than 100° C., it is difficult to carry out evaporation of the solvent. When the drying temperature is higher than 350° C., the conductive material may be oxidized undesirably during the drying at high temperature. Therefore, it is preferred that the drying temperature is 100° C. or higher and does not exceed 350° C. In addition, the drying process is preferably carried out at the temperature as mentioned above for about 10 minutes to 6 hours. Such a drying process can perform drying (solvent evaporation) of the molded composition for a negative electrode while allowing binding of powdery particles, thereby improving the strength of the negative electrode.

The lithium secondary battery according to the present disclosure includes the above-described negative electrode, a positive electrode, a separator interposed between the positive electrode and the negative electrode, and an electrolyte.

The positive electrode may be obtained by applying a mixture of a positive electrode active material, a conductive material and a binder to a positive electrode current collector, followed by drying. If desired, the mixture may further include a filler. The positive electrode active material is a compound capable of reversible lithium intercalation and deintercalation and particular examples thereof include a lithium metal composite oxide containing at least one metal, such as cobalt, manganese, nickel or aluminum, and lithium. More particularly, particular examples of the lithium metal composite oxide may include at least one selected from: lithium-manganese oxides (e.g. $LiMnO_2$, $LiMn_2O_4$, or the like), lithium-cobalt oxides (e.g. $LiCoO_2$, or the like), lithium-nickel oxides (e.g. $LiNiO_2$, or the like), lithium-nickel-manganese oxides (e.g. $LiNi_{1-Y}Mn_YO_2$ (wherein $0<Y<1$), $LiMn_{2-Z}Ni_ZO_4$ (wherein $0<Z<2$), or the like), lithium-nickel-cobalt oxides (e.g. $LiNi_{1-Y1}Co_{Y1}O_2$ (wherein $0<Y1<1$), or the like), lithium-manganese-cobalt oxides (e.g. $LiCo_{1-Y2}Mn_{Y2}O_2$ (wherein $0<Y2<1$), $LiMn_{2-Z1}Co_{Z1}O_4$ (wherein $0<Z1<2$), or the like), lithium-nickel-manganese cobalt oxides (e.g. $Li(Ni_pCo_qMn_{r1})O_2$ (wherein $0<p<1$, $0<q<1$, $0<r1<1$, $p+q+r1=1$), $Li(Ni_{p1}Co_{q1}Mn_{r2})O_4$ (wherein $0<p1<2$, $0<q1<2$, $0<r2<2$, $p1+q1+r2=2$), or the like), and lithium-nickel-cobalt-transition metal (M) oxides (e.g. $Li(Ni_{p2}Co_{q2}Mn_{r3}M_{s2})O_2$ (wherein M is selected from the group consisting of Al, Fe, V, Cr, Ti, Ta, Mg and Mo, each of p2, q2, r3 and s2 independently represents the atomic ratio of an element, $0<p2<1$, $0<q2<1$, $0<r3<1$, $0<s2<1$, and $p2+q2+r3+s2=1$), or the like).

Particularly, in view of improvement in capacity characteristics and stability of an electrode, the lithium metal composite oxide may be $LiCoO_2$, $LiMnO_2$, $LiMn_2O_4$, $LiNiO_2$, lithium nickel manganese cobalt oxide (e.g. $Li(Ni_{1/3}Mn_{1/3}Co_{1/3})O_2$, $Li(Ni_{0.6}Mn_{0.2}Co_{0.2})O_2$, $Li(Ni_{0.4}Mn_{0.3}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like), or lithium nickel cobalt aluminum oxides (e.g. $Li(Ni_{0.8}Co_{0.15}Al_{0.05})O_2$, etc.), or the like. Specifically, in order to improve output characteristics after storage derived from an increase in voltage, the lithium metal composite oxide may include a lithium-manganese oxide, such as $LiMnO_2$ or $LiMn_2O_4$ (LMO).

The positive electrode active material may be used in an amount of 80-99 wt % based on the total weight of the solid content in the positive electrode slurry. Non-limiting examples of the positive electrode current collector include foil made of aluminum, nickel or a combination thereof. Reference can be made about the above description of the conductive material and binder related with the negative electrode.

In general, the separator may be a porous substrate having a plurality of pores alone, or the porous substrate including a porous coating layer containing a plurality of inorganic particles and a binder polymer and coated on at least one surface thereof.

The porous substrate may be a porous polymer substrate and particular examples thereof include a porous polymer film substrate or porous polymer nonwoven web substrate.

The porous polymer film substrate may be a porous polymer film including polyolefin, such as polyethylene or polypropylene. Such a polyolefin porous polymer film substrate may realize a shut-down function at a temperature of 80-130° C.

In addition, the porous polymer film substrate may be obtained by molding various polymers, such as polyesters, other than polyolefins, into a film shape. Further, the porous polymer film may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins. Although the porous substrate is not particularly limited in thickness, but preferably has a thickness of 1-100 μm, more preferably 5-50 μm. There is no particular limitation in the pore size and porosity in the porous substrate. However, the pore size and porosity are preferably 0.01-50 μm and 10-95%, respectively.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

The weight ratio of the inorganic particles to the binder polymer is preferably 50:50-99:1, and more preferably 70:30-95:5. When the weight ratio of the inorganic particles to the binder polymer satisfies the above-defined range, the amount of the binder polymer is increased to prevent a decrease in pore size and porosity in the coating layer to be formed. It is also possible to solve the problem of degradation of peeling resistance of the coating layer caused by a decrease in amount of the binder polymer.

In the porous coating layer, the inorganic particles are bound among themselves by the binder polymer while they are packed and are in contact with each other. Thus, interstitial volumes are formed among the inorganic particles and the interstitial volumes become vacant spaces to form pores.

In other words, the binder polymer attaches the inorganic particles to each other so that they may retain their binding states. For example, the binder polymer connects and fixes the inorganic particles with each other. In addition, the pores of the porous coating layer are those formed by the interstitial volumes among the inorganic particles which become vacant spaces. The space is defined by the inorganic particles facing each other substantially in a closely packed or densely packed structure of the inorganic particles.

The inorganic particles are selected from the group consisting of inorganic particles having a dielectric constant of 5 or more, inorganic particles capable of transporting lithium ions or a mixture thereof.

According to an embodiment of the present disclosure, the electrolyte includes a salt having a structure of $A^+B^-$. Herein, $A^+$ includes an alkali metal cation, such as $Li^+$, $Na^+$, $K^+$ or a combination thereof. $B^-$ includes an anion, such as an anion of $F^-$, $Cl^-$, $Br^-$, $I^-$, $NO_3^-$, $BF_4^-$, $PF_6^-$, $N(CN)_2^-$, $SCN^-$, $ClO_4^-$, $A_sF_6^-$, $CF_3SO_3^-$, $(CF_3SO_2)_2^-$, $C(CF_2SO_2)_3^-$, $(CF_3)_3PF_3^-$, $(CF_3)_4PF_2^-$, $(CF_3)_5PF^-$, $(CF_3)_6P^-$, $(CF_3CF_2SO_2^-)_2N$, $(CF_3SO_2)_2N^-$, $CF_3SO_3^-$, $CF_3CF_2(CF_3)_2CO^-$, $(CF_3SO_2)_2CH^-$, $(CF_3SO_2)_3C^-$, $CF_3(CF_2)_7SO_3^-$, $CF_3CO_2^-$ or $CH_3CO_2^-$, or a combination thereof. Preferably, the salt having a structure of $A^+B^-$ is a lithium salt.

The salt having a structure of $A^+B^-$ is dissolved or dissociated in an organic solvent. Non-limiting examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone butyrolactone) or a combination thereof.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

In another aspect, there are provided a battery module including the secondary battery as a unit cell, and a battery pack including the battery module.

As described above, the lithium secondary battery according to the present disclosure uses lithium titanium oxide as a negative electrode active material and uses an inexpensive lithium manganese composite oxide having high room temperature stability as a positive electrode active material, so that the output characteristics may be improved while not causing degradation of high-temperature characteristics and a decrease in battery capacity. Thus, it is possible to provide a battery pack which can be used efficiently as a substitute for a lead storage battery for vehicles or as an additive to the lead storage battery.

The battery pack may include a plurality of lithium secondary batteries connected in series, or a plurality of lithium secondary battery modules connected in series and having a plurality of lithium secondary batteries connected in parallel.

The battery pack may be used as an electric power source for a device requiring high temperature stability, improved cycle characteristics and high rate characteristics. Particular examples of the device may include but are not limited to: power tools driven by an electric motor; electric cars, including electric vehicles (EV), micro-hybrid electric vehicles (u-HEV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

A negative electrode was obtained as described hereinafter by using lithium titanium oxide $Li_4Ti_5O_{12}$ powder having a variable particle shape, specific surface area, average particle diameter ($D_{50}$) and pellet density as shown in the following Table 1.

First, 92 wt % of the lithium titanium oxide $Li_4Ti_5O_{12}$ powder, 4 wt % of carbon black as a conductive material and 4 wt % of polyvinylidene fluoride (PVdF) as a binder were added to N-methyl-2-pyrrolidone (NMP) as a solvent to form a negative electrode mixture slurry. The resultant negative electrode mixture slurry was applied to aluminum (Al) foil having a thickness of about 20 µm as a negative electrode current collector and then dried. After that, roll pressing was carried out to obtain a negative electrode including an active material layer having a porosity of about 33%.

<Manufacture of Positive Electrode>

First, 91 wt % of $Li(Ni_{0.4}Co_{0.3}Mn_{0.3})O_2$ as a positive electrode active material, 3.5 wt % of carbon black as a conductive material and 5.5 wt % of polyvinylidene fluoride (PVdF) as a binder were added to N-methyl-2-pyrrolidone (NMP) as a solvent to obtain a positive electrode mixture slurry. The resultant positive electrode mixture slurry was applied to aluminum (Al) foil having a thickness of about 20 µm as a positive electrode current collector and then dried. After that, roll pressing was carried out to obtain a positive electrode.

<Manufacture of Lithium Secondary Battery>

A porous polyethylene separator was interposed between the positive electrode and the negative electrode to form an electrode assembly. Then, the electrode assembly was introduced to a pouch type battery casing and an electrolyte containing 1 M $LiPF_6$ dissolved in a solvent including ethylene carbonate (EC) and diethyl carbonate (DEC) mixed at a volume ratio of 30:70 was injected thereto. After that, the battery casing was sealed to obtain a lithium secondary battery.

<Manufacture of Half-Cell>

A half-cell was manufactured as follows.

First, 92 wt % of the lithium titanium oxide $Li_4Ti_5O_{12}$ powder, 4 wt % of carbon black as a conductive material and 4 wt % of polyvinylidene fluoride (PVdF) as a binder were added to N-methyl pyrrolidone (NMP) as a solvent to obtain a negative electrode mixture slurry. Then, the slurry was applied onto aluminum foil to a thickness of 90 µm and vacuum dried at 120° C. to obtain a negative electrode (loading amount: 145±5 mg/25 cm²).

Then, the negative electrode was wound into a circular shape having a diameter of 12 mm and lithium metal foil was used as a counter electrode to obtain a 2032 type coin half-cell. The electrolyte used herein was 1.0M $LiPF_6$ solution dissolved in a solvent including ethylmethyl carbonate, propylene carbonate and dimethyl carbonate mixed at a volume ratio of 2:2:6.

EXAMPLES 2-6

Each of a negative electrode, a lithium secondary battery and a half-cell was obtained in the same manner as descried in Example 1, except that lithium titanium oxide $Li_4Ti_5O_{12}$ powder having a variable particle shape, specific surface area, average particle diameter ($D_{50}$) and pellet density was used as shown in the following Table 1.

COMPARATIVE EXAMPLES 1-8

Each of a negative electrode, a lithium secondary battery and a half-cell was obtained in the same manner as descried in Example 1, except that lithium titanium oxide $Li_4Ti_5O_{12}$ powder having a variable particle shape, specific surface area, average particle diameter ($D_{50}$) and pellet density was used as shown in the following Table 1.

TABLE 1

| | Particle shape | BET (m²/g) | $D_{50}$ (µm) | Pellet density (g/cc) |
|---|---|---|---|---|
| Example 1 | All primary particles | 6.3 | 0.5 | 1.72 |
| Example 2 | All primary particles | 6.0 | 0.7 | 1.73 |
| Example 3 | All secondary particles | 4.6 | 8 | 1.80 |
| Example 4 | All secondary particles | 4.7 | 6 | 1.79 |
| Example 5 | Mixture of primary particles with secondary particles (weight ratio 5:5) | 5.6 | 4 | 1.75 |

TABLE 1-continued

|  | Particle shape | BET (m²/g) | $D_{50}$ (μm) | Pellet density (g/cc) |
|---|---|---|---|---|
| Example 6 | Mixture of primary particles with secondary particles (weight ratio 2:8) | 5.3 | 8 | 1.82 |
| Comp. Ex. 1 | All primary particles | 4.6 | 1.0 | 1.75 |
| Comp. Ex. 2 | All primary particles | 6.0 | 1.3 | 1.78 |
| Comp. Ex. 3 | All primary particles | 6.0 | 0.7 | 1.68 |
| Comp. Ex. 4 | All secondary particles | 2.8 | 8 | 1.82 |
| Comp. Ex. 5 | All secondary particles | 5.2 | 8 | 1.68 |
| Comp. Ex. 6 | All secondary particles | 4.0 | 10 | 1.78 |
| Comp. Ex. 7 | All secondary particles | 4.2 | 8 | 1.71 |
| Comp. Ex. 8 | Mixture of primary particles with secondary particles (weight ratio 2:8) | 4.8 | 10 | 1.78 |

Characterization (1) Specific Surface Area

For each lithium titanium oxide $Li_4Ti_5O_{12}$ powder used in Examples 1-6 and Comparative Examples 1-8, the specific surface area was determined.

After heat treating $Li_4Ti_5O_{12}$ powder at 200° C., the specific surface area was determined by using a Brunauer Emmett Teller (BET) specific surface area analyzer. The results are shown in the following Tables 2 and 3.

(2) Average Particle Diameter ($D_{50}$)

The average particle diameter of each lithium titanium oxide $Li_4Ti_5O_{12}$ powder used in Examples 1-6 and Comparative Examples 1-8 was determined as follows.

To a 10 mL vial, 0.35 g of $Li_4Ti_5O_{12}$ powder and 5 drops of 10 wt % $NaPO_3$ solution as a dispersant were added. Next, the vial was filled totally with water and ultrasonification was carried out for 2 minutes. Then, the treated powder was determined for the average particle diameter by using a particle size analyzer (available from Microtrack Co.). The results are shown in the following Tables 2 and 3.

(3) Pellet Density

The pressing density of each lithium titanium oxide used in Examples 1-6 and Comparative Examples 1-8 was determined by using MCP-PD51, a powder resistance measuring system available from Mitsubishi Chemical. The results are shown in the following Tables 2 and 3.

(4) Initial Capacity Based on Li Intercalation (0.2 C, mAh/g)

The initial capacity of each of the half-cells according to Examples 1-6, Comparative Examples 1-4 and Comparative Examples 6-8 was determined on the basis of the second discharge (Li intercalation) capacity at 0.2 C. Herein, the cut off voltage was 1.0-2.5V.

(5) Rate (Intercalation-Based) Capacity Ratio (10 C/0.2 C)

Each of the half-cells according to Examples 1-6, Comparative Examples 1-4 and Comparative Examples 6-8 was subjected to charging/discharging in the pattern as shown in the following Table 2, and then the ratio of 10 C discharge capacity of the third stage based on 0.2 C discharge capacity of the second cycle of the first stage was determined. Herein, a pause time of 20 minutes was given between one stage and another state. The results are shown in the following Table 3.

As the value of the ratio is increased, the battery shows higher diffusion ability of lithium and allows the electrolyte to wet LTO active material particles well, and thus is favorable to the manufacture of a high-output battery.

TABLE 2

| Stage | Charge (Li ion deintercalation) | | Discharge (Li ion intercalation) | | Cycle number | Reset time |
|---|---|---|---|---|---|---|
|  | C-rate | Mode | C-rate | Mode |  |  |
| $1^{st}$ | 0.2 C | CC | 0.2 C | CC | 2 | 20 minutes |
| $2^{nd}$ | 0.2 C | CC | 1 C | CC | 1 |  |
| $3^{rd}$ | 0.2 C | CC | 10 C | CC | 1 |  |

TABLE 3

|  | Particle shape | BET (m²/g) | $D_{50}$ (μm) | Pellet density (g/cc) | Initial capacity based on Li intercalation (0.2 C, mAh/g) | Rate capacity ratio (Intercalation based) 10 C/0.2 C (%) | Reference |
|---|---|---|---|---|---|---|---|
| Example 1 | All primary particles | 6.3 | 0.5 | 1.72 | 171 | 90 | Excellent capacity and rate characteristics |
| Example 2 | All primary particles | 6.0 | 0.7 | 1.73 | 170 | 86 | Excellent capacity and rate characteristics |
| Example 3 | All secondary particles | 4.6 | 8 | 1.80 | 168 | 82 | Excellent capacity and rate characteristics |
| Example 4 | All secondary particles | 4.7 | 6 | 1.79 | 168 | 84 | Excellent capacity and rate characteristics |
| Example 5 | Mixture of primary particles with secondary particles (weight ratio 5:5) | 5.6 | 4 | 1.75 | 170 | 88 | Excellent capacity and rate characteristics |

TABLE 3-continued

| | Particle shape | BET ($m^2/g$) | $D_{50}$ (μm) | Pellet density (g/cc) | Initial capacity based on Li intercalation (0.2 C, mAh/g) | Rate capacity ratio (Intercalation based) 10 C/0.2 C (%) | Reference |
|---|---|---|---|---|---|---|---|
| Example 6 | Mixture of primary particles with secondary particles (weight ratio 2:8) | 5.3 | 8 | 1.82 | 170 | 90 | Excellent capacity and rate characteristics |
| Comp. Ex. 1 | All primary particles | Less than the lower limit of the range 4.6 | Within the range 1.0 | Within the range 1.75 | 163 | 78 | Poor capacity and rate characteristics |
| Comp. Ex. 2 | All primary particles | Within the range 6.0 | More than the upper limit of the range 1.3 | Within the range 1.78 | 165 | 75 | Poor capacity and rate characteristics |
| Comp. Ex. 3 | All primary particles | Within the range 6.0 | Within the range 0.7 | Less than the lower limit of the range 1.68 | 170 | 85 | Electrode density is not satisfied. Electrode manufacture is not allowed (Al foil was torn during pressing). |
| Comp. Ex. 4 | All secondary particles | Less than the lower limit of the range 2.8 | Within the range 8 | Within the range 1.82 | 162 | 70 | Poor capacity and rate characteristics |
| Comp. Ex. 6 | All secondary particles | Within the range 4.0 | More than the upper limit of the range 10 | Within the range 1.78 | 162 | 77 | Poor capacity and rate characteristics |
| Comp. Ex. 7 | All secondary particles | Within the range 4.2 | Within the range 8 | Less than the lower limit of the range 1.71 | 168 | 80 | Cell design is not allowed |
| Comp. Ex. 8 | Mixture of primary particles with secondary particles (weight ratio 2:8) | Within the range 4.8 | More than the upper limit of the range 10 | Within the range 1.78 | 163 | 77 | Poor capacity and rate characteristics |

Referring to Table 3, in the case of Examples 1-6, when using lithium titanium oxide particles completely satisfying an average particle diameter ($D_{50}$) of 0.5-9 μm, a specific surface area of 3-7 $m^2/g$, and a pellet density of 1.7 g/cc or more under a pressure of 64 MPa, it is possible to obtain excellent capacity and rate characteristics of a battery, and thus to apply the lithium titanium oxide particles to a high-output battery.

On the contrary, Comparative examples not satisfying at least one of the average particle diameter, specific surface area and pellet density provide poor capacity and rate characteristics, cannot allow the manufacture of an electrode, or are not amenable to design of a cell.

What is claimed is:

1. A negative electrode active material comprising:
   lithium titanium oxide particles,
      wherein the lithium titanium oxide particles have an average particle diameter ($D_{50}$) of 0.5-9 μm, a specific surface area of 3-7 $m^2/g$, and a pellet density of 1.7 g/cc or more under a pressure of 64 MPa, and the lithium titanium oxide is represented by the following Chemical Formula 1,
   wherein the lithium titanium oxide particles are a mixture of primary particles with secondary particles, and a weight ratio of the primary particles to the secondary particles is between 1:9 and 4:6:

[Chemical Formula 1]

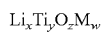

Wherein M is any one selected from the group consisting of Zr, B, Sn, S, Be, Ge and Zn, or a combination of two or more of them, $0.5 \leq x \leq 5$, $1 \leq y \leq 5$, $2 \leq z \leq 12$, and $0 \leq w < 0.1$.

2. The negative electrode active material according to claim 1, wherein the primary particles have an average particle diameter ($D_{50}$) of 0.2-1.2 μm and a specific surface area of 5-7 m²/g.

3. The negative electrode active material according to claim 2, wherein the primary particles have a pellet density of 1.7-1.82 g/cc under a pressure of 64 MPa.

4. The negative electrode active material according to claim 1, wherein the secondary particles have an average particle diameter ($D_{50}$) of 2-9 μm and a specific surface area of 3-4.9 m²/g.

5. The negative electrode active material according to claim 4, wherein the secondary particles have a pellet density of 1.75-1.85 g/cc under a pressure of 64 MPa.

6. The negative electrode active material according to claim 1, wherein the lithium titanium oxide is at least one selected from the group consisting of of $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, $LiTi_2O_4$ and $Li_2TiO_3$.

7. The negative electrode active material according to claim 1, which further comprises any one active material particles selected from the group consisting of: a carbonaceous material; metal (Me); alloy including the metal (Me); oxide (MeOx) of the metal (Me); and a composite of the metal (Me) with carbon, or a combination of two or more of them.

8. The negative electrode active material according to claim 7, wherein the metal (Me) is one or more of Si, Sn, Li, Mg, Cd, Ce, or Fe.

9. A lithium secondary battery which comprises
a positive electrode comprising a positive electrode active material,
a negative electrode comprising a negative electrode active material,
a separator interposed between the positive electrode and the negative electrode, and an electrolyte,
wherein the negative electrode active material is the negative electrode active material as defined in claim 1.

10. The negative electrode active material according to claim 1, wherein the lithium titanium oxide particles are a mixture of primary particles with secondary particles, and a weight ratio of the primary particles to the secondary particles is between 5:5 and 2:8.

* * * * *